United States Patent
Schwartz

[11] 4,017,187
[45] Apr. 12, 1977

[54] DOUBLE ROTATION INERTIAL MEASUREMENT APPARATUS

[75] Inventor: Bernard Schwartz, Melville, N.Y.

[73] Assignee: Sperry Rand Corporation, New York, N.Y.

[22] Filed: June 23, 1975

[21] Appl. No.: 589,319

[52] U.S. Cl. .................................. 356/106 LR
[51] Int. Cl.² ................................ G01B 9/02
[58] Field of Search ........................ 356/106 LR

[56] References Cited
UNITED STATES PATENTS

3,563,662   2/1971   Wing ................. 356/106 LR

Primary Examiner—Vincent P. McGraw
Attorney, Agent, or Firm—Howard P. Terry

[57] ABSTRACT

Apparatus for sensing movement with respect to mutually orthogonal axes includes a plurality of ring laser motion sensors, mounted so as to lie as if in planes which would define contiguous mutually perpendicular surfaces such as are found at a corner of a cube, wherein the cube is rotated constantly about a diagonal axis thereof. The rotation imparts equal components of rotation to each of the ring laser motion sensors, thereby eliminating the effects of mode locking and assuring that the beat frequencies obtained by heterodyning signals related to the contra-rotating light waves of each motion sensor are linearly related, over the operating range of the inertial device, to the components of rotational rate measured parallel to the input axes of the respective ring laser motion sensors. The rotating sensor system is supported along its spin axis in an inner gimbal member for rotation, in turn, about an outer or vertical axis perpendicular thereto. The effects of fixed or slowly changing bias errors are substantially cancelled in the system, any remaining drift about inertial or earth's coordinate axes being substantially minimized by periodic reversal of the sense of rotation about the outer axis.

12 Claims, 5 Drawing Figures

REVERSING MECH.

a $\quad \dot{\theta}_{i-1} = c_{i1} \dot{\theta}_{1-0} + c_{i2} \dot{\theta}_{2-0} + c_{i3} \dot{\theta}_{3-0} + \dot{\theta}_{bi}$ b $\quad \dot{\theta}_{e-i} = b_{1i-1} \omega_N + b_{2i-1} \omega_E + b_{3i-1} \omega_K$ c $\quad \dot{\phi}_i = \dot{\theta}_{i-1} - \dot{\theta}_{e-i}$ d $\quad b_{i1-1} = b_{i1-0} + \int_0^t (\dot{\phi}_3 b_{i2-1} - \dot{\phi}_2 b_{i3-1})\, dt$ e $\quad b_{i2-1} = b_{i2-0} + \int_0^t (\dot{\phi}_1 b_{i3-1} - \dot{\phi}_3 b_{i1-1})\, dt$ f $\quad b_{i3-1} = b_{i3-0} + \int_0^t (\dot{\phi}_2 b_{i1-1} - \dot{\phi}_1 b_{i2-1})\, dt$ g $\quad b_{i1-2} = b_{i1-1}$ h $\quad b_{i2-2} = b_{i2-1} \cos\theta_a + b_{i3-1} \sin\theta_a$ i $\quad b_{i3-2} = -b_{i2-1} \sin\theta_a + b_{i3-1} \cos\theta_2$ j $\quad b_{i1-3} = -b_{i3-2} \sin\theta_b + b_{i1-2} \cos\theta_b$ k $\quad b_{i2-3} = b_{i2-2}$ l $\quad b_{i3-3} = b_{i3-2} \cos\theta_b + b_{i1-2} \sin\theta_b$ m $\quad \theta_Z = \tan^{-1}(b_{21-3} / b_{11-3})$ n $\quad \theta_P = -\sin^{-1} b_{31-3}$ o $\quad \theta_R = \tan^{-1}(b_{32-3} / b_{33-3})$ p $\quad a_{i-1} = f_{i-1} a_{1-0} + f_{i2} a_{2-0} + f_{i3} a_{3-0} + a_{bi}$ q $\quad a_N = b_{11-m} a_{1-1} + b_{12-m} a_{2-1} + b_{13-m} a_{3-1}$ r $\quad a_E = b_{21-m} a_{1-1} + b_{22-m} a_{2-1} + b_{23-m} a_{3-1}$ s $\quad a_K = b_{31-m} a_{1-1} + b_{32-m} a_{2-1} + b_{33-m} a_{3-1}$

DOUBLE ROTATION INERTIAL MEASUREMENT APPARATUS

BACKGROUND OF THE INVENTION

1. Field of the Invention

The invention pertains to inertial reference apparatus employing ring laser motion sensors for navigation purposes and more particularly concerns improved double rotation inertial apparatus affording precise determination of craft attitude, position, and velocity in a system relatively less expensive than the conventional gyroscopic inertial platform system.

2. Description of the Prior Art

In the prior art system of the W. G. Wing U.S. Pat. No. 3,563,662 for an "Apparatus for Sensing Movement About a Plurality of Axes", issued Feb. 16, 1971 and assigned to Sperry Rand Corporation, there is presented an inertial reference system in which certain disadvantages of conventional strapped-down inertial references are overcome by mounting ring laser motion sensors, for example three, at respective ones of three orthogonally arranged planes which may be disposed in the form of a portion of a cube. Simultaneous rotation of the three ring-laser sensors to overcome the threshold bias problem explained by Wing and others is provided by rotating the ring laser sensors about a corner-to-corner diagonal of the cube, thereby imparting to each of the ring laser sensors a component of the input angular rate equal to $1/\sqrt{3}$ times the input angular rate. Thus, a single rotational input serves to bias all three ring-laser sensors simultaneously above their respective thresholds; a significant mechanical simplification is achieved as compared with a system using individual rotational biasing. The varying frequency outputs of the three ring-laser sensors are fed to a suitable computer and attitude updating computations are performed to maintain, in the computer, quantities which represent the attitude of the effective cube carrying the ring laser sensors with respect to a stable coordinate system. Three acceleration sensors are also mounted at the three planes of the cube with their sensing axes collinear with the sensing axis of the ring laser sensors. The outputs of the accelerometers are also fed to the computer to transform the acceleration information from the coordinates of the cube into the stable coordinate system in order that conventional inertial navigation computations may be performed. It will be appreciated that, in using the above approach, it is not necessary to make an accurate measurement of the rotation rate used for the biasing operation; for the purposes of the navigational computation, the ring laser sensors themselves provide this information. The rate of rotation preferably is high enough to keep all of the ring-laser sensors above their respective thresholds, although it is desirable that the rate be no greater than is required for this purpose because of computational speed considerations and ring-laser scale factor accuracy considerations. Thus, means are provided by Wing whereby the biasing rate input is automatically adjusted to maintain the lowest of the three ring-laser sensor output frequencies always above the threshold value.

The laser ring motion sensor is particularly adaptable to operation in inertial reference systems of the kind described by Wing, as the ring laser sensor is in many respects an equivalent of the conventional mechanical rate gyroscope. However, in addition to the properties of a rate gyroscope, it has inherent characteristics which are uniquely suited to strapped-down inertial navigation systems for use as the angular rate sensors therein. The first of these characteristics is its inherently digital output in that, above a predetermined threshold, it provides an output frequency linearly proportional to its input angular rate. Secondly, it has the ability accurately to measure angular velocity over an extremely wide range and, third, it has a highly accurate scale factor. However, a ring laser sensor has one outstanding deficiency when used in a navigation system in that it has a threshold or dead zone about zero turn rate in which its output frequency is not proportional to its input rate. This is caused by a mode locking phenomenon inherent in ring laser devices. The mode locking phenomenon precludes accurate measurement of low angular rates within the dead zone such as are actually required in navigation systems. Various methods have been suggested for biasing the ring laser sensor at least partially to overcome this deficiency, such as by the use of a Faraday bias cell in one leg of the ring to cause the zero frequency dead zone to occur at some input rate well outside the region of intended operation. One method which does not degrade performance of the ring-laser sensor when utilized in a navigation system is to provide a rotational bias sufficient to maintain the sensor well above its threshold level. A navigation system could be arranged for three-axis sensing in which a trio of ring-laser sensors have their individual sensing axes at right angles with respect to each other and with each rotated about its respective sensing axis at a predetermined rate for biasing purposes. It will be appreciated, however, that such an approach leads to mechanical complexities to be avoided in a strapped-down inertial navigation system.

The inventor Wing fully recognized that large errors could accumulate in his apparatus with respect to use of single axis rotation, a factor which he remedied by periodic reversal of the sense of rotation of the mounting system for his triad of ring-laser sensors. While the Wing apparatus represents an advantageous and useful concept, it demonstrates two problems that are solved by the present inventor. First, during reversals of the Wing apparatus about his single rotation axis, each of the three ring laser sensors goes through the dead zone and useful output information is lost for a significant time period.

The second problem present in the Wing apparatus lies in the effect of the considerable time used in reversing the rotation of the driven system. The Wing apparatus is rigidly connected to a craft that, in the general case, will be undergoing angular rotation about at least one axis. If the Wing inertial measurement device were not experiencing such craft angular rotation, the compensation provided by Wing's reversal techniques would wipe out almost the complete bias. However, in the usual situation, the craft is undergoing angular motion about any of three axis; then, the error vectors do not line up exactly opposite each other and there must be a net angular error, and hence, build-up of navigational errors in the associated navigational computer system. The faster the reversal is effected in the Wing apparatus, the smaller the build-up of navigational error. In actual practice, it is found that rotation reversal in the Wing apparatus would be required in very short periodic intervals, for example, as often as once every thirty seconds. Considering the practical limits imposed upon the design by the inertia of the ring laser sensor system and its supporting structure, that configuration would be almost constantly accelerated and decelerated, requiring the undesired expenditure of considerable power. In such a circumstance, it would also be found that the time period that the ring laser sensors spend in their non-linear or dead zone regions would be quite substantial, further degrading the utility of the information supplied by the inertial measurement unit. It is seen that a relatively higher rate of effective reversal is desired on the foregoing basis. A further advantage of relatively rapid reversal of the system is that the errors associated with low frequency drifts, such as those caused by temperature variation in various parts of each ring-laser sensor, are diminished.

SUMMARY OF THE INVENTION

This invention, like that of the Wing patent, relates to apparatus for sensing craft movement with respect to three mutually orthogonal axes and includes a plurality of ring-laser motion sensors, mounted so as to lie as if in planes which would define contiguous mutually-perpendicular surfaces such as those found at a corner of a cube, and wherein the cube is rotated at a constant rate about a diagonal axis thereof. The rotation again imparts equal components of rotations to each of the ring-laser motion sensors, thereby eliminating the undesirable effects of mode locking and also assuring that the beat frequencies obtained by heterodyning signals related to the contra-rotating light waves of each motion sensor are linearly related, over the useful operating range of the inertial device, to the components of rotation rate measured parallel to the input axes of the respective ring-laser motion sensors. According to the present invention, the rotating sensor system is additionally supported along its spin or inner axis in an outer gimbal member for rotation about an outer or vertical axis perpendicular to the spin axis. The effects of fixed or slowly changing bias errors are substantially cancelled in the novel system, any remaining drift about the outer axis being substantially limited by the periodic reversal of the outer axis rotation. The two major problems exhibited by the Wing apparatus are removed without undue complexity, since a synchronous motor drive, rather than a servo system, may be employed to drive the inner spin axis of the apparatus and reversal thereof is obviated. Alternatively, a servo motor driven to maintain fixed inertial angular rate may be employed, resulting in improved error cancellation. While the trio of accelerometers employed in the present invention may be disposed in the same manner as proposed by Wing upon the inner rotating element or mounted on the craft itself, they are preferably according to the present invention, located on the reversing outer gimbal. In this situation, the number of complex slip rings is advantageously reduced.

DESCRIPTION OF THE PREFERRED EMBODIMENTS

Figures 1, 2:
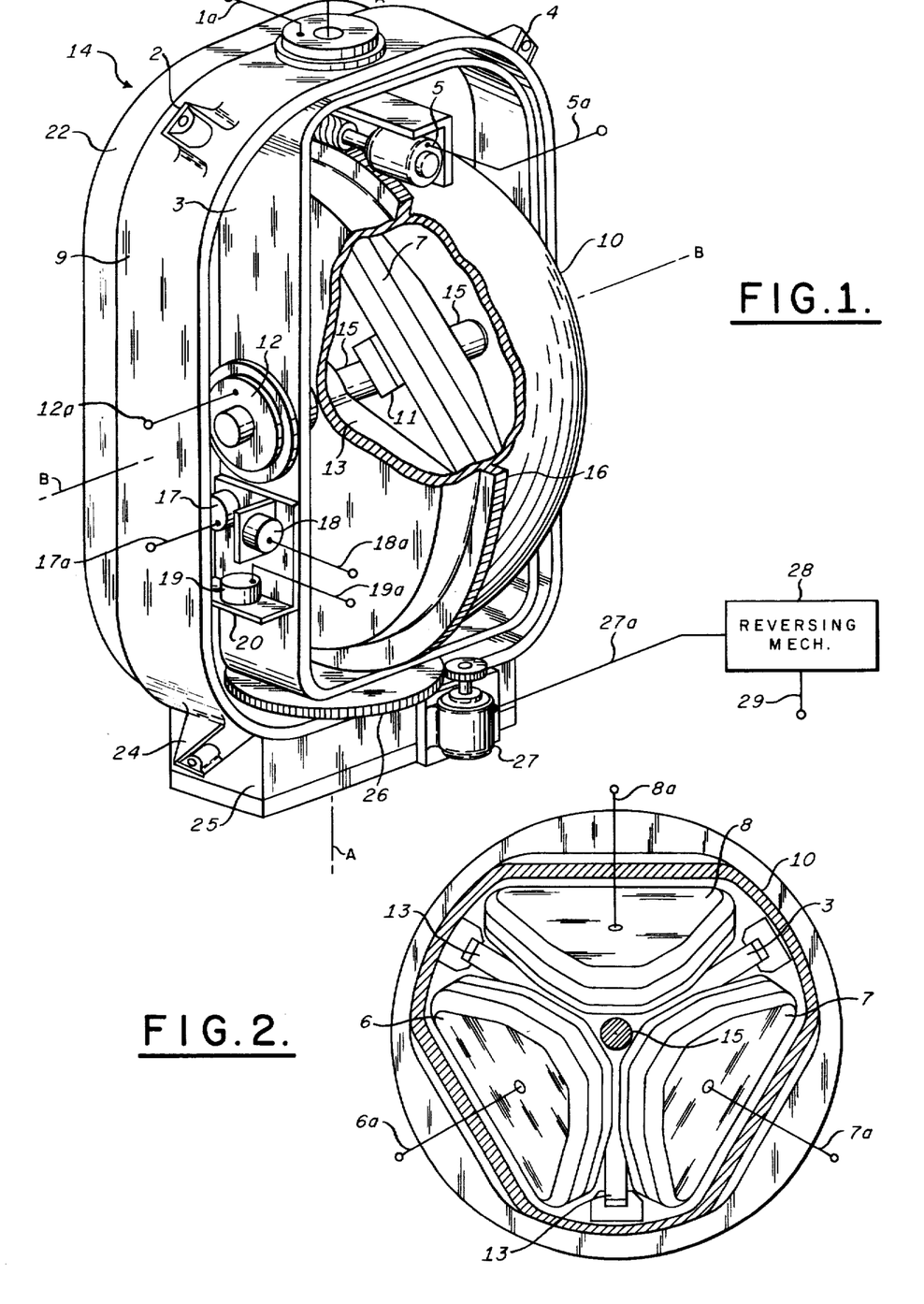
FIG. 1 is a perspective view, partly in cross-section, of a preferred form of the inertial measurement unit.
FIG. 2 is an elevation cross section view of apparatus within the configuration of FIG. 1.

The inertial reference unit of the present invention is illustrated generally in FIG. 1 as a reference device 14 mounted within a fixed frame 9, frame 9 being equipped with mounting brackets such as those at locations 2, 4, and 24 for fixing the instrument to the craft with reference to which navigational measurements are to be achieved. Fixed frame 9 also serves as a part of a protective container for the instrument, a container that is completed by dust covers 22 located on opposed sides of the fixed frame 9; only one dust cover 22 is shown, merely as a matter of convenience.

The active measurement system of the inertial measurement unit 14 comprises a triad of orthogonally mounted ring laser motion detector systems, only one of which is seen at 7 in FIG. 1. The three ring-laser sensors including ring-laser sensor 7 are fixedly mounted, as will be further described, for rotation on shaft 15 about the axis B—B within the inner spin member 10, the housing of which may include a generally conformal magnetic shield. The inner spin member 10 and the triad of ring-laser sensor devices 6, 7, and 8 may be supported with respect to axis B—B and the shaft 15 aligned therewith by a spoked support element 13. The interior of inner spin member 10 may be controlled to operate substantially at a preferred constant temperature. Member 10, through the agency of shaft 15, is journaled on conventional trunnions aligned with axis B—B and supported within the opposite vertical sides of drive frame 3. The latter frame is conveniently made in the shape of an upright upper-case dee so that additional elements including certain inertial references may be supported on the drive frame 3.

The drive frame 3 cooperates with several elements for driving the laser-ring sensor measurement apparatus enclosed by inner spin member 10 about axis B—B. The rate of rotation of the inner spin member 10 and its contents about axis B—B is, in one representative form of the apparatus, about 20 revolutions per minute. For the driving purpose, an electrical motor 5 supplied with power via leads 5a is also provided for example, with a gear meshing with the equatorial ring gear 16 fixed to the outer surface of inner spin member 10. An angular shaft position pick off 12, such as a synchro device or a conventional high resolution digital incremental shaft position encoder, is provided on driving frame 3 at axis B—B to supply output signals on leads 12a representative of the instantaneous angular position of shaft 15 and, therefore, of the ring-laser sensor and measurement assembly. An accelerometer cluster of mutually perpendicular accelerometers 17, 18, and 19 is mounted on bracket 20 affixed to drive frame 3. The actual location of the cluster on drive frame 3 may vary but, as in the illustrative assembly of FIG. 1, accelerometer 17 has a sensitive axis parallel to axis B—B, accelerometer 19 has a sensitive axis parallel to axis A—A, and accelerometer 18 has a sensitive axis perpendicular to both of the axes A—A and B—B. Signals representing acceleration voltages thus appear on leads 17a, 18a, and 19a.

Drive frame 3 is supported on trunnions in the horizontal parts of the fixed frame 9, is aligned with the craft yaw axis A—A, and is driven to rotate within the fixed frame 9 about axis A—A. The rate of rotation about axis A—A is, in one representative apparatus, approximately one revolution per minute. However, unlike the inner spin member 10 which is driven continuously in one direction, the drive frame 3 is driven, for example, through one or more complete revolutions in one direction and its sense of rotation is then reversed for an equal one or more complete revolutions, the cycle normally being continuously repeated. For driving the drive frame 3 in this cyclic manner, a reversible motor 27 is fixed to a base part 25 of the fixed frame 9 and drives the drive frame through gearing 26. While reversal of motion of the apparatus by mechanism 28 powered by lead 29 has major benefits yet to be further discussed, the arrangement in one embodiment of the invention avoids the use of slip rings between fixed frame 9 and drive frame 3. The reversing motion allows the use of a wiring harness projecting through a hollow trunnion on axis A—A at the base portion 25.

An angular shaft position pick off 1, such as a synchro or a conventional high resolution incremental shaft position encoder, is provided on fixed frame 9 at axis A—A to supply output signals on leads 1a representative of the instantaneous angular position of the drive frame 3. The base part 25 may contain power supplies and certain of the electronic controls yet to be described; additional electronic control envelopes may be mounted directly upon the ring-laser sensor structures, as at 11.

Figure 5:
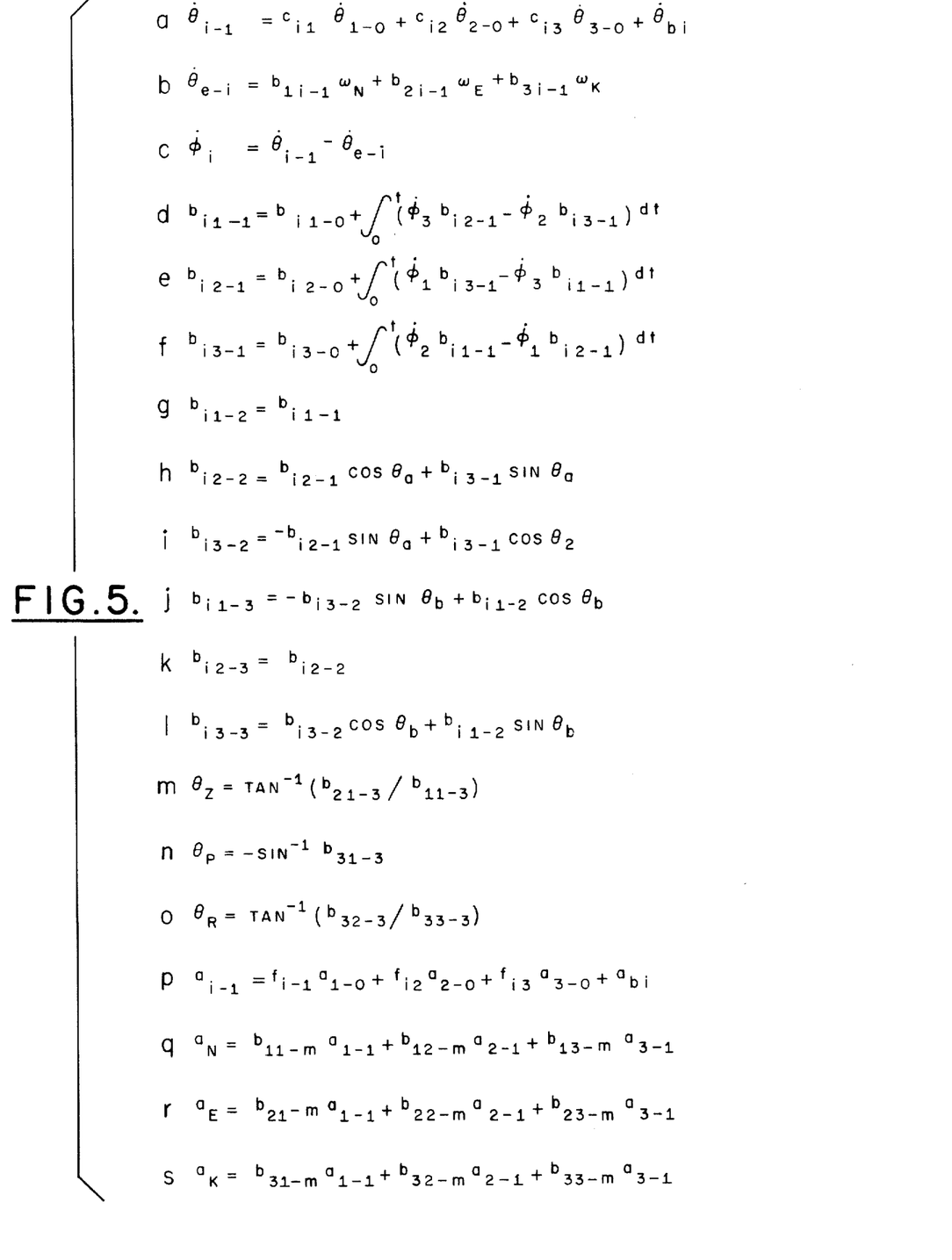
FIG. 5 presents equations useful in explaining the operation of the invention.

The location of the ring-laser units with respect to axis 15, where three such units 6, 7, and 8 are employed is more clearly seen in FIG. 2. The laser reference units 6, 7, and 8 pend from conventional brackets mounted on the frame formed by the spokes 13 in the same relative configuration as illustrated in FIG. 5 of the aforementioned Wing U.S. Pat. No. 3,563,662, the mounting configuration being equivalent in function to the pyramidal portion of a cube as shown by Wing, the pyramidal portion being formed by slicing a cube at a plane perpendicular to a selected corner-to-corner diagonal of the cube, which diagonal serves in the present invention as the axis of rotation B—B as it did in Wing's device. Thus, the three laser ring sensors 6, 7, and 8 are symmetrically mounted as if they were on the three adjacent mutually orthogonal surfaces of a truncated cube, as illustrated by Wing, the planes of the laser rings making equal angles with the rotational axis B—B.

Ring-laser sensors suitable for employment in the invention are well known in the art as closed loop traveling wave devices particularly for sensing the direction and amplitude of small rotational rates about an axis normally perpendicular to the ring. They are described, for example, in several U.S. patents assigned to Sperry Rand Corporation, including the C. C. Wang U.S. Pat. No. 3,382,758 for a "Ring Laser Having Frequency Offsetting Means Inside of Optical Path", issued May 14, 1968, and in the W. M. Masek U.S. Pat. No. 3,382,759 for a "Ring Laser Biased by Zeeman Frequency Offset Effect for Sensing Slow Rotations", issued May 14, 1968, in his U.S. Pat. No. 3,382,760 for a "Coherent Light Frequency Difference Sensor", issued May 14, 1968, in his U.S. Pat. No. 3,508,831 for a "Ring Laser Having Minimized Frequency Locking Characteristics", issued Apr. 28, 1970, in his U.S. Pat. No. 3,486,130 for a "Ring Laser Having a Quarter Wave Plate for Rotating the Plane of Polarization of Light Which is Reflected Back into the Ring from the Combining Optics", issued Dec. 23, 1969, and in his U.S. Pat. No. 3,480,878 for a "Ring Laser with Means for Reducing Coupling to Backscattered Waves", issued Nov. 25, 1969, and elsewhere.

As has been discussed in the foregoing, the inertial measurement unit 14 employs three ring-laser sensors 6, 7, 8 and three accelerometers 17, 18, 19. The ring-laser sensors are mounted with their sensitive axes mutually orthogonal. The ring laser cluster is rotated about two other axes symmetrically positioned with respect to the laser rings. The primary purpose of the rotation is to cancel instrument bias errors. An angle transducer 12 between the rotating members links the ring laser coordinate frame, which is fixed to the inner spin member 13, to the drive frame member 3. The triad of mutually orthogonal accelerometers 17, 18, 19 is mounted on the drive frame member 3, thereby realizing some cancellation of accelerometer instrument bias. A second angle transducer 1 measures the angle of the drive frame member 3 with respect to the fixed frame 9. This frame is normally rigidly attached to the craft.

Figure 3:
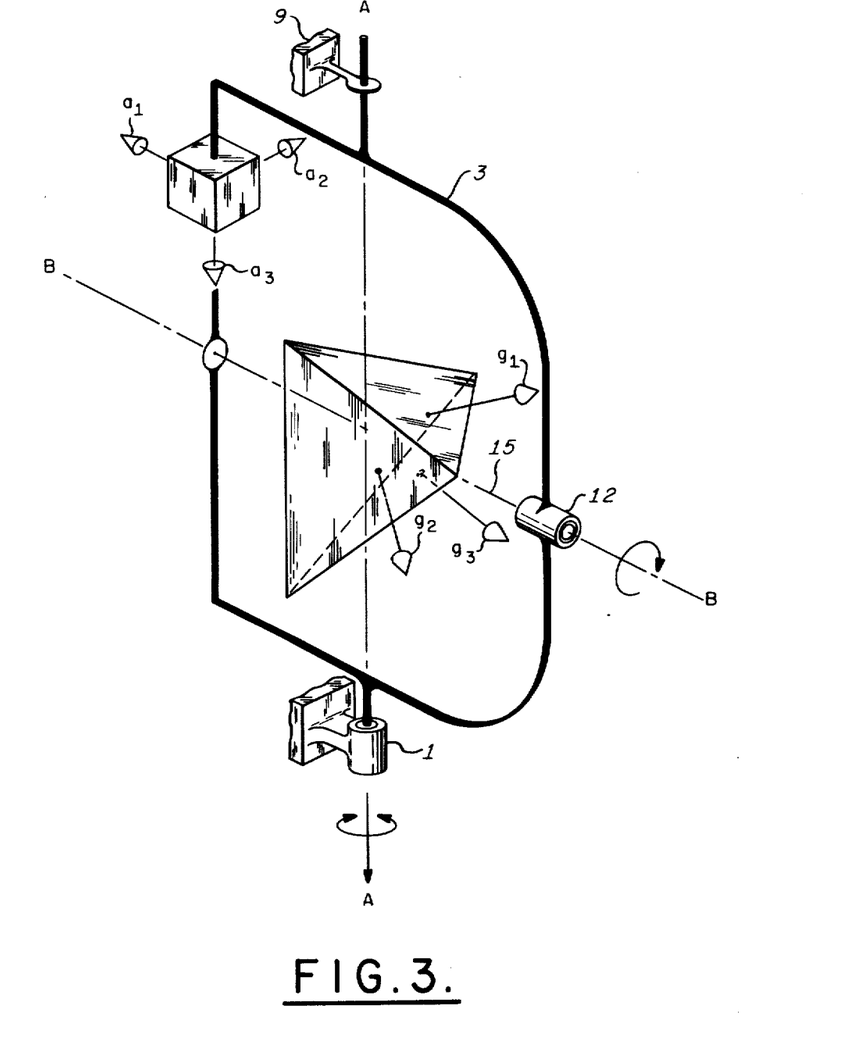
FIG. 3 is a diagram useful in explaining operation of the invention.

FIG. 3 illustrates the orientation of the ring-laser sensor axes and the nature of the rotations. For simplicity, all coordinate frames are shown with zero angles of rotation. As shown, the ring laser sensitive axes $g_1$, $g_2$, $g_3$ are normal to three orthogonal faces of the tetrahedron. The spin axis B—B of the inner spin member passes symmetrically through the solid angle formed by the ring laser sensitive axes so that the plane of each ring laser is at an angle of $\cos^{-1}(1/\sqrt{3})$ with respect to the inner spin member axis B—B.

The residual bias in the output of each ring laser sensor can be represented as a vector along its sensitive axis. Now, the laser rings have the desirable properties of negligible acceleration sensitivity and very low magnetic sensitivity. Hence, each laser bias is independent of the orientation of the ring about its axis. The total bias is the vector sum of those presented by the three rings lasers. Since the biases are independent of the individual relative orientations, this resultant bias vector remains fixed relative to the sensor assembly.

The resultant bias can readily be resolved into two components: one along the axis of rotation B—B of the inner spin member and one normal to that axis. As the inner spin member turns, the normal component of bias sweeps through all directions in the plane normal to the axis of rotation B—B. This motion causes the normal component to self-cancel along any axis in the normal plane. Although the normal component of bias cancels, the component along the axis of rotation B—B is not reduced. In fact, there is increased effective drift about the axis of rotation B—B due to any scale factor error present. However, as will be explained, these latter errors are desirably minimized according to the invention by the rotation applied to the drive frame member 3.

As was the case with the bias errors, the laser ring sensor scale factor error is independent of orientation about each ring laser axis. The constant unidirectional component of inner spin member rotation seen by each ring multiples the scale factor error to produce a steady bias-like error vector along the ring sensor sensitive axis. The vector sum of these scale factor error vectors from each laser ring is a vector that is fixed with respect to the cluster frame. Like the resultant bias error vector, the resultant scale factor error vector can be decomposed into a component along the axis of rotation B—B of the inner spin member and a component normal to that axis. The normal component is automatically self-cancelled due to the rotation. The component of the scale factor error vector along the inner spin member axis of rotation B—B adds to the bias error vector along that axis to produce a net steady effective drift.

The axis of rotation A—A of the drive frame member 3 is normal to the axis of rotation B—B of the inner spin member. Hence, the components of bias and scale factor error vectors which were not eliminated by the inner rotation about axis B—B are self-cancelled by the drive frame rotation. However, like the inner spin rotation, the constant sense of rotational motion of the drive frame member multiplies the scale factor errors to produce steady scale factor error vectors. As before, the only component of the resultant scale factor error vector which is not cancelled by the rotation of the drive frame member 3 lies along the axis of rotation A—A of that member. This final error is eliminated, according to the invention by repeatedly reversing the direction of rotation of the drive frame member 3 after an integral number of full 360° turns about axis A—A. Hence, all the steady errors are desirably averaged to a mean of zero by the invention.

Although the average of the steady errors is zero, there are instantaneous errors. The instantaneous effective ring laser sensor drifts are modulated by a factor $\sin \omega t$, where $\omega$ is the rotation rate of the inner spin or the drive frame member, depending on which axis is being considered. When the ring laser sensor information is integrated to compute attitude, the effective integrated drifts become tilts modulated by $[1/\omega] \cos \omega t$. Hence, particularly for the inner spin rotation axis B—B where $\omega$ is high, the instantaneous effective tilts are advantageously sharply reduced by the rotation. Velocity and position errors which arise from these modulated errors are even further reduced by the square and cube of $\omega$, respectively. Another advantageous feature of the rotation system of the present invention deserves mention. The component of inner spin rotation seen by each ring laser is large enough to bias the lasers away from lock-in even in the presence of vehicle motions. Hence, no special biasing mechanism is required in the ring lasers themselves.

The accelerometers 17, 18, 19 are mounted on the drive frame member 3, which member rotates about the vehicle yaw axis A—A. In certain applications, rotation about the vehicle roll axis is preferred. For rotation about the yaw axis, the components of the accelerometer biases appearing in the horizontal plane self-cancel. The vertical accelerometer error is not affected by the rotation. The novel rotations of the strapped down laser rings provide error cancellations which greatly improve system performance. The motions may be obtained with simple constant-speed drive motors 5 and 27. Speed uniformity is not critical, since angle read-outs 1 and 12 are provided. Hence, the mechanical structure is much simpler and less critical than those of stabilized platforms with the servo loops and gimbal torque motors normally associated with inertial gyroscopic reference systems.

The ring-laser sensor is ideally suited for use in systems such as the present one that employ drift modulation or drift monitoring techniques. First of all, rotation, even at very high space rates, does not adversely affect laser-ring sensor performance. A major limitation to the drift reduction usually achieved by drift modulation is the case-oriented drift of the gyroscope used, which is not reduced by such processes. The laser-ring sensor exhibits extremely low case-oriented drift, even when its input axis is reversed or rotated relative to the gravity vector. The laser ring sensor's acceleration-sensitive drift is normally negligible. Its magnetic sensitivity can be held to negligible values with very limited shielding. Using the double-rotation drift modulation technique of the present invention, a relatively inexpensive navigation system employing lasers can yield the performance needed for high accuracy navigation applications. Prior approaches would call for an appreciably more complex and expensive system in order even to approach the accuracy obtainable with the laser-ring sensor system.

Figure 4:
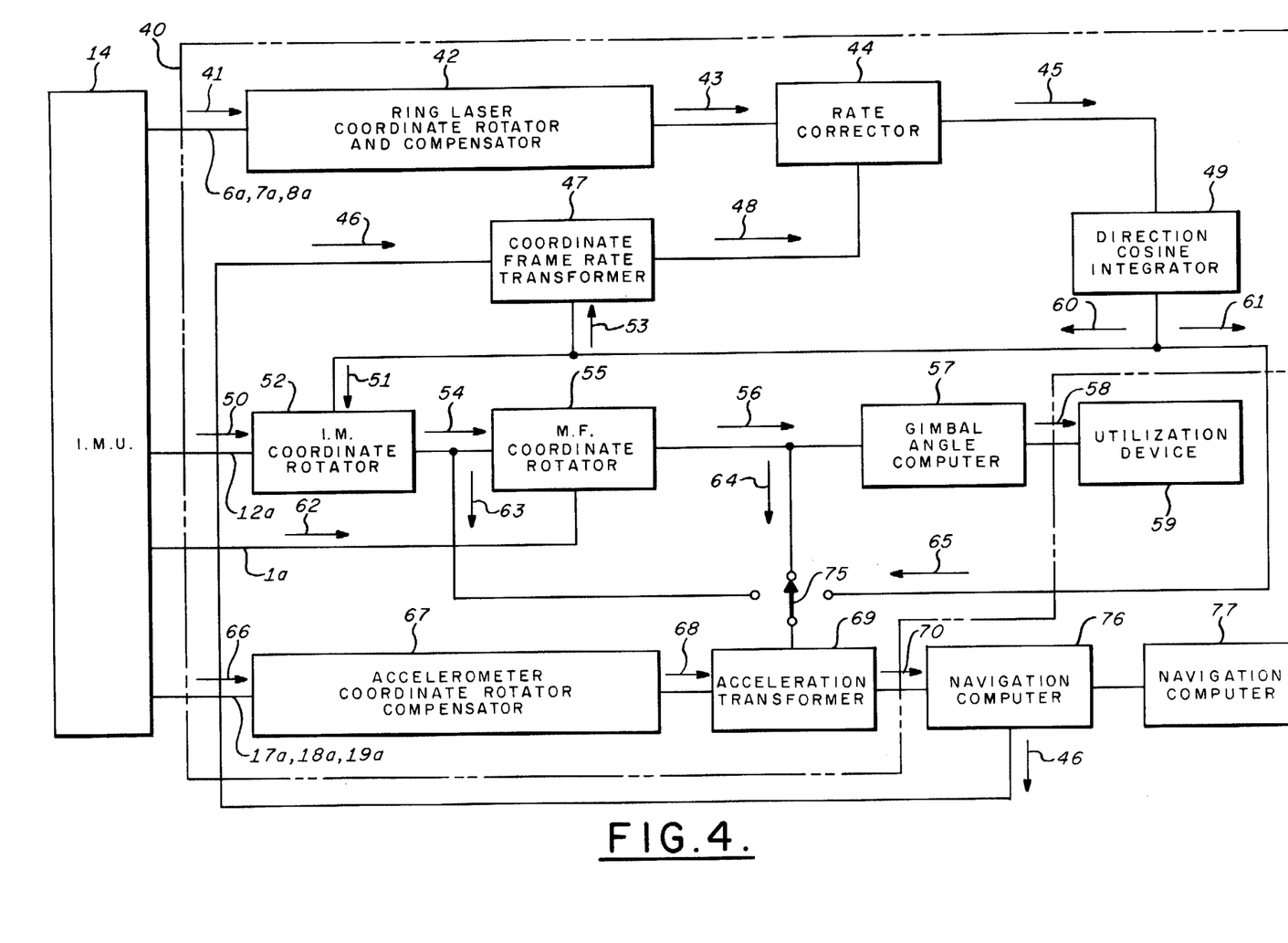
FIG. 4 is a block diagram of a computer system for use with the novel inertial measurement unit showing the components thereof and their interconnections.

The several signals generated by the inertial measurement unit 14 of FIG. 4 are to be manipulated by a computer for the purpose of deriving signals directly useful in displays or in a conventional navigation control system, as shown in FIG. 4. In order to discuss the operation of a suitable computer and control system, it is advisable first to present a general glossary of terms that will define the various variables entering into the problem:

$a_{bi}$ = acceleration bias along the $i$'th member on which accelerometers 17, 18, and 19 are mounted.

$a_E$ = East component of acceleration.

$a_{i-o}$ = acceleration measured by the $i$'th accelerometer.

$a_{i-i}$ = acceleration along the $i$'th axis of the member on which the accelerometers are mounted.

$a_k$ = vertical component of acceleration.

$a_N$ = North component of acceleration.

$b_{ij-o}$ = the initial value of $b_{ij-i}$.

$b_{ij-m}$ = direction cosines of the $m$'th body; $m = 1$ represents the inner spin member 10, $m = 2$ applies to the middle member or drive frame 3, $m = 3$ applies to the outer or fixed frame unit 9, and $i$ refers to the earth's coordinate with $i = 1$ for the North coordinate, $i$ 2 for the East coordinate, and $i = 3$ for the vertical downwardly directed coordinate, while $j$ refers to the member axes.

$c_{ij}$ = the transformation coefficient for the $i$'th ring laser axis to the $j$'th axis of the inner spin member; these coefficients include scale factor and alignment corrections.

$f_{ij}$ = the transformation coefficient for the $i$'th accelerometer axis to the $j$'th axis of the member on which the accelerometers are mounted; these coefficients include scale factor and alignment corrections.

$\theta_a$ = the angle that the inner spin member 10 is rotated with respect to the middle member or drive frame 3 about axis B—B.

$\theta_b$ = the angle the drive frame 3 is rotated with respect to the fixed frame 9 about axis A—A.

$\theta_{bi}$ = the ring laser bias correction transformed to the $i$'th inner spin member axis.

$\theta_{ei}$ = coordinate frame rates transformed to the $i$'th inner spin member axis.

$\theta_P$ = equivalent craft pitch angle.

$\theta_R$ = equivalent craft roll angle.

$\theta_Z$ = equivalent craft azimuth angle.

$\theta_{i-o}$ = measured angular rates for the $i$'th laser $\theta_{i-i}$ = computed angluar rates along the inner spin member $i$'th axis.

$\theta_i$ = angular rates about the $i$'th inner spin member axis including corrections for angular rates of the reference geodetic coordinate frame.

$\omega_E$ = angular rate of the craft coordinate system about the East axis. $\omega_V$ = angular rate of the craft coordinate system about the vertical axis.

$\omega_N$ = angular rate of the craft coordinate system about the North axis.

These terms will be employed in the analysis involving equations (A) through (S) of FIG. 5. In the three ring system illustrated in the present case, the general relation $i = 1, 2,$ or 3 applies to each of the equations (A) through (S) in which $i$ appears.

In the system of FIG. 4, the outputs of the inertial measurement unit 14 are coupled to a computer 40 where these data are processed to compute attitude and acceleration values that are substantially the same as those normally generated by a conventional stable gyroscopic platform and may be employed in utilization device 59 to generate a display or in a navigation computer 76 to control navigation or steering elements represented by the navigation device 77.

In FIG. 4, the inertial measurement unit 14 provides outputs on leads 6a, 7a, 8a represented by arrow 41 which include the $\theta_{1-0}$, $\theta_{2-0}$, and $\theta_{3-0}$ angular turn rate signals generated by ring lasers 6, 7, and 8. It further provides accelerometer outputs on leads 17a, 18a, and 19a represented by arrow 66 in FIG. 4, these acceleration signals being represented by $a_{1-0}$, $a_{2-0}$, and $a_{3-0}$. On leads 1a, it provides signals $\theta_a$ generated by pick off 1 and represented by arrow 62 which signals are a measure of the instantaneous angle between drive frame member 3 and the fixed frame 9. On leads 12a, it provides signals $\theta_b$ generated by pick off 12 and represented by arrow 50, which signals are a measure of the instantaneous angle between the inner spin member 10 and the drive frame member 3.

The ring laser angular rate output signals 41 are applied to the ring laser coordinate rotator and compensator element 42. Since these signals are angular rates relating to the laser ring axes, they are transformed in device 42 to the coordinate system of the axes of the inner spin member 10, one of which is the inner spin member rotation axis B—B. The transformation is effected in a conventional manner such that scale factors and bias are readily accounted for according to equation (A) of FIG. 5, where $i = 1, 2,$ or 3. It will be understood in considering device 42 and its functions discussed in connection with FIG. 4 that they may be provided by employing conventional analog instrumentation or that known equivalent digital instrumentation may be connected and operated in a directly equivalent manner to achieve the desired results, as will be apparent to one with average skill in the analog or digital computer arts. For example, it is apparent that equation (A) involves only simple multiplication and addition steps that are readily accomplished by conventional analog or digital computer elements or by a conventional general purpose computer.

The values $\theta_{i-1}$ of equation (A) are, as represented by arrow 43, applied to rate corrector circuit 44, which in essence comprises a conventional analog or digital subtraction circuit and whose second input is represented by arrow 48 and is yet to be described. The generation of signals 48 depends upon the operating presence of a conventional navigation computer 76 generating output signals 46 which measure conventional rates of rotation of the craft frame axes, these craft frame rates being $\omega_N$, $\omega_E$, and $\omega_V$. The craft frame rates 46 are applied to the coordinate frame rate transformer 47 to which signals 53 are also coupled. In the North, East vertical coordinate system, the craft frame rates include, as usual, the earth's rotation rate plus the angular rate required to remain in the North, East, and vertical coordinate system while moving over the surface of the earth. To accomplish this, the craft frame rates are converted in the usual manner from earth coordinates into the inner drive member coordinates in the coordinate frame rate transformer 47 using signals 53. The foregoing will be further understood by examination of equation (B) of FIG. 5 which concerns the manipulation in the coordinate frame rate transformer of the inputs $\omega_N$, $\omega_E$, and $\omega_V$ to generate $\theta_{e-i}$ terms, again by simple multiplication and addition steps, for introduction as signal 48 into rate corrector 44. The output of the latter is then $\theta_i$, as expressed by equation (C).

The corrected rate signal 45, as now expressed by equation (C), is coupled to a direction cosine integrator 49 where, in a conventional manner, signal 45 is employed in ordinary subtraction, integration, and addition means for the generation of signals expressed by the three equations (D), (E) and (F). The signals $b_{i1-i}$, $b_{i2-i}$, and $b_{i3-i}$ are each supplied as indicated by arrows 60, 61, and 51 to other apparatus for use as yet to be discussed. It is seen that the outputs of the rate corrector 44 are the angular rates of the inner spin member 10 relative to the earth's reference frame. These values are integrated in the direction cosine integrator 49 to provide direction cosines associated with the inner spin member 10. It will be understood that, if the system is to operate in inertial coordinates rather than in earth's coordinates, the coordinate frame rate transformer 47 will be omitted. Also, in certain applications, the functions of the direction cosine integrator 49 may be performed by a conventional means for first computing the Euler parameters by integration and then by converting them into direction cosines.

An additional use is made of the outputs of the direction cosine integrator 49, as indicated by arrow 51, as an input to the inner member-middle member (I.M.) rotator 52 which also receives the inner spin member angle signals 50. Rotator 52 rotates the coordinates of the direction cosines by the measured angle between the inner spin member 10 and the middle or drive member 3, as represented by equations (G), (H), and (I). Thus, an input 50 applied to rotator 52 is $\theta_a$, the angle between the inner spin member 10 and the middle or drive member 3, and its output comprises middle member direction cosine terms represented by arrow 54. The output 54 of rotator 52 is coupled to the middle drive member-fixed frame member (M.F.) rotator 55.

In addition to the terms defined by equations (G), (H), and (I), a further input to rotator 55 represented by arrow 62 is $\theta_b$, the angle between the middle or drive member 3 and the fixed frame 9 of the inertial measurement unit. The middle or drive member directional cosines are rotated in element 55 according to the $\theta_b$ value, so that the outputs of rotator 55 are expressed by equations (J), (K), and (L) and are represented by arrow 56.

Where it is desired to provide in the craft a utilization device 59, such as a display for presenting craft attitude information, the signals represented by arrow 56 are modified in the conventional gimbal angle computer 57. As is indicated by equations (M), (N), and (O), computer 57 performs simple division and trigonometric manipulations to derive the respective attitude angle signals $\theta_Z$, $\theta_P$, and $\theta_R$. These values correspond to those ordinarily derived for navigation purposes on the three axes of a three gimbal stable gyroscopic platform. They may be used directly in a conventional craft attitude display or may enjoy further modification in usage by device 59.

As is well understood in the art, certain lineal acceleration terms are desired for use in the navigation computer 76 upon whose operation computer 40 depends. In the preferred form of the invention, the triad of mutually perpendicular accelerometers 17, 18, and 19 is located on the driven frame 3; i.e., $m = 2$. There are important advantages in placing the accelerometers as illustrated in FIG. 1 on a vertical portion of the driven frame 3, these advantages having been discussed in the foregoing. In general, however, the accelerometer cluster may be placed on the fixed frame 9 (where $m = 3$) or on the inner spin member 10 as is done in the Wing patents ($m = 1$).

In any event, the accelerometer outputs 66 on leads 17a, 18a, and 19a are first transformed to the coordinates of the member on which they are mounted in a conventional manner according to equation (P), where $i$ is again 1, 2, or 3. This transformation takes place in the conventional accelerometer coordinate rotation and compensation element 67 which also provides any required correction for accelerometer scale factor and bias errors in the well known manner.

Before use in navigation computer 76, the signals 68 output by rotator compensator 67 must be rotated into earth's coordinates using the particular direction cosines corresponding to the member upon which accelerometers 17, 18, and 19 are mounted; this is accomplished by applying the corrected accelerations 68 to the conventional acceleration transformer 69, wherein $a_N$, $a_E$, and $a_K$ are formed using conventional means defined by equations (Q), (R), and (S). In the preferred form of the apparatus, the accelerometer cluster is located on the driven member 3 so that $m = 2$.

The versatile computation system of FIG. 4 may, however, be used advantageously with other inertial measurement unit configurations. For example, according to the factory setting of switch 75 leading to acceleration transformer 69, the direction cosines are taken as signals 63 from the I.M. rotator 52 if the accelerometer cluster is on the inner spin member 10 ($m = 1$), as signals 64 from the M.F. rotator 55 if the accelerometers are on the drive member 3 ($m = 2$), and as signals 65 from the direction cosine integrator if the accelerometers are on the fixed frame 9 ($m = 3$). In any event, the transformed acceleration signals 70 are supplied to a conventional navigation computer 76 of the kind normally used with stable platform navigation systems for generation of signals 46 and for operation of any of the usually associated guidance equipment or displays, including longitude and latitude displays.

It is evident by inspection that solutions of each of the foregoing equations may be accomplished by any of several known methods, including the use of a cooperative assembly or known analog or digital data processing or computing circuits. For example, the several equations involve simple arithmetic operations, including trigonometric functions and addition, subtraction, multiplication, division, and integration. Many examples of both analog and digital computation elements are available in the prior art for accomplishing such computer operations ad it is well known that they may readily be coupled together in cooperative relation for attaining desired results. It is furthermore evident that a conventional general purpose digital or analog computer may be employed for the purpose. It is obviously well within the ordinary skill of digital computer programmers to process the equations discussed above, to create flow charts, and to translate the latter into computer routines and sub-routines for solution of such equations along with a compatible computer language for processing input data and instructions to produce outputs directly useful for application, for example, in a standard display. It will be further evident to those skilled in the art that the same digital or other computer system may be used cooperatively to perform the functions of computers 40 and 76.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. Inertial measurement apparatus comprising:
    a plurality of equi-spaced ring laser means similarly disposed upon an inner spin member about a spin axis, thereof,
    all of said ring laser means being disposed in individual planes at equal predetermined angles with respect to said spin axis,
    spin motor means for rotating said inner spin member about said inner spin axis in a predetermined direction for eliminating mode-lock operation of each of said ring laser means within a predetermined operating range and whereby first components of bias and scale factor errors of the ring laser means outputs are cancelled,
    drive frame means including first trunnion means for supporting said inner spin member therein,
    reversible motor means for reversibly rotating said drive frame means about a second axis substantially perpendicular to said inner spin axis whereby second components of bias and scale factor errors of said ring laser means output are cancelled, and
    fixed frame means including second trunnion means for supporting said drive frame means for reversible rotation about said second axis,
    said reversible motor means serving to drive said drive frame means with respect to said fixed frame means through successive integral numbers of revolutions after respective successive reversals thereof.

2. Apparatus as described in claim 1 wherein said integral number is unity.

3. Apparatus as described in claim 1 additionally including acceleration sensor means mounted upon at least one of said inner spin member, said drive frame means, or said fixed frame means.

4. Apparatus as described in claim 1 wherein the respective sensitive axes of said ring laser means are substantially mutually orthogonal.

5. Apparatus as described in claim 3 wherein said acceleration sensor means includes first, second, and third accelerometer means having respective substantially mutually orthogonal sensitive first, second, and third axes and disposed upon said drive frame means for reversible rotation about said second axis.

6. Apparatus as described in claim 5 wherein said first accelerometer means sensitive axis is substantially parallel to said inner spin axis and said second accelerometer means sensitive axis is substantially parallel to said second axis whereby bias errors of said first and third accelerometer outputs are substantially cancelled.

7. Apparatus as described in claim 5 further including computer means responsive at least to first, second, and third of said plurality of ring laser means and to said first, second, and third accelerometer means.

8. Apparatus as described in claim 7 further including:

first pick-off means for providing a first measure of the instantaneous angular position of said inner spin member with respect to said drive frame means, and second pick-off means for providing a second measure of the instantaneous angular position of said drive frame means with respect to said fixed frame means, said computer means being additionally responsive to said first and second pick-off means.

9. Apparatus as described in claim 8 wherein said computer means comprises:

first coordinate rotator means responsive to said plurality of ring laser means for transforming the coordinates of the angular turn rate output signals thereof into coordinates associated with said inner spin axis, rate corrector means responsive to said first coordinate rotator means for generating signals representative of angular rates of said inner spin member relative to earth's coordinates, and direction cosine integrator means responsive to said rate corrector means for generating signals representative of direction cosines of said inner spin member with respect to the said earth's coordinates.

10. Apparatus as described in claim 9 wherein said computer means additionally includes:

second coordinate rotator means responsive to said direction cosine integrator means and to said first pick-off means, and third coordinate rotator means responsive to said second coordinate rotator means and to said second pick-off means for generating signals representative of said direction cosine signals in craft coordinates.

11. Apparatus as described in claim 10 further comprising:

gimbal angle computer means responsive to said third coordinate rotator means for deriving signals representative craft azimuth, pitch, and roll angles, and craft navigation display means responsive to said gimbal angle computer means.

12. Apparatus as described in claim 10 further comprising:

acceleration transformer means responsive to said first, second, and third accelerometer means and selectively to said second coordinate rotator means, said third coordinate rotator means, or to said direction cosine integrator means for generating signals representative of craft acceleration in earth's coordinates, said first coordinate rotator means being further responsive to said acceleration transformer means.

* * * * *